US012779374B2

(12) United States Patent
Shepherd

(10) Patent No.: US 12,779,374 B2
(45) Date of Patent: Nov. 3, 2026

(54) BOWL FILTER CARTRIDGE ARRANGEMENT HAVING TRAP AND METHODS

(71) Applicant: Donaldson Company, Inc., Bloomington, MN (US)

(72) Inventor: Mark C. Shepherd, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 484 days.

(21) Appl. No.: 18/284,658

(22) PCT Filed: Mar. 29, 2022

(86) PCT No.: PCT/US2022/022301

§ 371 (c)(1),
(2) Date: Sep. 28, 2023

(87) PCT Pub. No.: WO2022/212340

PCT Pub. Date: Oct. 6, 2022

(65) Prior Publication Data

US 2024/0173653 A1 May 30, 2024

Related U.S. Application Data

(60) Provisional application No. 63/168,006, filed on Mar. 30, 2021.

(51) Int. Cl.
*B01D 29/21* (2006.01)
*B01D 29/58* (2006.01)
(Continued)

(52) U.S. Cl.
CPC ............ *B01D 29/21* (2013.01); *B01D 29/58* (2013.01); *B01D 35/30* (2013.01); *B01D 36/003* (2013.01);
(Continued)

(58) Field of Classification Search
None
See application file for complete search history.

(56) References Cited

U.S. PATENT DOCUMENTS 4,933,093 A 6/1990 Keller
5,458,010 A * 10/1995 Traina ............... G01N 33/0011 73/864.34

(Continued)

FOREIGN PATENT DOCUMENTS

DE 102014000716 A1 7/2015
WO 2009046019 A1 4/2009

(Continued)

OTHER PUBLICATIONS

European Examination Report for 22716776.4 mailed Feb. 6, 2025, 5 pages.

(Continued)

*Primary Examiner* — Richard C Gurtowski
(74) *Attorney, Agent, or Firm* — Merchant & Gould P.C.

(57) ABSTRACT

A bowl filter cartridge has an annular trap to catch and collect any contaminant, debris, or unfiltered fuel remaining in the filter housing during filter service. This prevents material being collected in the trap from being transferred to the clean side of a new filter, thereby reducing engine exposure.

20 Claims, 10 Drawing Sheets

(51) Int. Cl.
*B01D 35/30* (2006.01)
*B01D 36/00* (2006.01)

(52) U.S. Cl.
CPC .................. *B01D 2201/295* (2013.01); *B01D 2201/347* (2013.01)

(56) References Cited

U.S. PATENT DOCUMENTS

| | | | |
|---|---|---|---|
| 6,248,236 B1 | 6/2001 | Hodgkins | |
| 6,296,765 B1 | 10/2001 | Brown et al. | |
| 2003/0178360 A1* | 9/2003 | Haldopoulos .......... | B01D 35/30 210/435 |
| 2006/0060512 A1* | 3/2006 | Astle ......................... | C02F 9/20 210/90 |
| 2010/0101993 A1 | 4/2010 | Wells et al. | |
| 2015/0021246 A1 | 1/2015 | Sturgess | |
| 2015/0151226 A1 | 6/2015 | Ries et al. | |
| 2015/0292448 A1* | 10/2015 | Campbell ........ | F02M 35/02416 55/502 |
| 2016/0082368 A1 | 3/2016 | Morris et al. | |
| 2016/0296862 A1 | 10/2016 | Libfeld et al. | |
| 2016/0369797 A1 | 12/2016 | Pribanic et al. | |

FOREIGN PATENT DOCUMENTS

| | | |
|---|---|---|
| WO | 2011126136 A1 | 10/2011 |
| WO | 2013039767 A1 | 3/2013 |
| WO | 2017120113 A1 | 7/2017 |

OTHER PUBLICATIONS

International Search Report and Written Opinion for PCT/US2022/022301 (May 24, 2022).

* cited by examiner

BOWL FILTER CARTRIDGE ARRANGEMENT HAVING TRAP AND METHODS

This application is a National Stage Application of PCT International Patent Application No. PCT/US2022/022301, filed Mar. 29, 2022, which claims the benefit of and priority to U.S. provisional application 63/168,006, filed Mar. 30, 2021, which applications are incorporated herein by reference. To the extent appropriate, a claim of priority is made to each of the above disclosed applications.

TECHNICAL FIELD

The present disclosure relates to liquid filter arrangements useable, for example, as fuel filters. Methods of assembly and use are also provided.

BACKGROUND

Circulating liquid systems, such as fuel, hydraulic fluids, and lubricating fluids, typically require a filter arrangement. The filter arrangement is typically positioned so that the fluids are filtered by passage through filter media positioned within the filter arrangement. Typically the filter arrangement is configured so that the componentry containing the media is a service part, i.e., the media can, periodically, be removed and be replaced.

There are two common types of liquid filter arrangements. The first, typically referred to herein as a "spin-on" type, involves a filter head installed on equipment, and a spin-on filter member or cartridge. The filter member or cartridge is often referred to as "spin-on" because the assembly including the filter media is typically secured to the filter head by threading. In spin-on arrangements, the filter media is typically secured within a shell or housing as a housing/media combination, and the entire housing/media combination, as a filter member or cartridge, is removed and replaced during servicing.

The second common type of liquid filter arrangement is referred to herein as a bowl/cartridge arrangement. With a bowl/cartridge arrangement, the filter head is again installed on the equipment. The filter media, however, is contained within a filter cartridge in a form removably positioned within a housing or shell. A housing/cartridge combination is again mounted on the filter head for use. However, during servicing, the housing is disconnected from the filter head, the media contained within the housing or shell is replaced, and the same shell or housing, with the replacement media inside, is then remounted on the filter head.

SUMMARY

According to the present disclosure, a variety of features and techniques are provided that can be implemented in liquid filter arrangements, such as a fuel filter arrangement or hydraulic or lubricant (oil) filter arrangements. The techniques are generally applicable to bowl/cartridge filter arrangements.

A filter assembly is provided including a housing having a surrounding wall defining an interior volume; an open mouth in communication with the interior volume; an end opposite of the open mouth; and a surrounding trap in the interior volume. The surrounding trap includes a nonporous upright section radially spaced from the surrounding wall, and a nonporous connecting section bridging the upright section and an interior surface of the surrounding wall. The upright section has an upstream surface facing the interior surface of the surrounding wall. A filter cartridge is removably positioned in the interior volume of the housing. The filter cartridge has a media pack having first and second opposite end regions; a first end cap secured to the first end region of the media pack; a second end cap secured to the second end region of the media pack; and a seal member on the second end cap and positioned to form a seal with the upstream surface of the upright section.

The seal member can be one of overmolded with the second end cap, formed with the second end cap, and/or attached to the second end cap.

In some example embodiments, the media pack can include a cylinder of pleated media.

In some example embodiments, the second end cap can include a seal holder projecting axially from the second end cap and holding the seal member to form an inwardly directed radial seal with the upstream surface of the upright section.

Some embodiments have a diameter of the upstream surface of the upright section is greater than 80% of an outer diameter of the media pack.

Some embodiments have a diameter of the upstream surface of the upright section is less than 120% of an outer diameter of the media pack.

The first end cap can include a seal holder projecting axially from the first end cap and holding a seal member to form an outwardly directed radial seal.

In some embodiments, the housing can include a water collection bowl with a valve opening at the end opposite of the open mouth.

The trap is preferably located between the second end cap and the water collection bowl.

Some arrangements preferably include a plurality of ribs along the interior surface of the surrounding wall.

In some embodiments, the upright section has a downstream surface on an opposite side from the upstream surface, and further including a plurality of ribs along the downstream surface of the upright section.

A terminal end of the upright section can be axially between the second end region of the media pack and the connecting section of the trap.

In some embodiments, an exterior of the surrounding wall includes a threaded section adjacent to the mouth and a seal member.

In some embodiments, the filter cartridge further includes an open filter interior and a hydrophobic mesh media member in the open filter interior.

In preferred arrangements, the second end cap has an open center.

In many examples, the first end cap has a fluid opening containing the hydrophobic mesh media member.

In another aspect, a method of servicing a bowl cartridge filter assembly is provided. The filter assembly has a housing and a removable filter cartridge therein. The method includes removing the filter cartridge from an interior volume of the housing; providing a new filter cartridge; and positioning the new filter cartridge in the interior volume of the housing to orient a seal member secured to the filter cartridge against an upstream surface of an upright section of a trap radially spaced from, and facing, an interior surface of the housing In another aspect, a filter cartridge for removable positioning in a bowl-cartridge filter assembly is provided. The filter cartridge includes a media pack having first and second opposite end regions; a first end cap secured to the first end region of the media pack; a second end cap secured to the second end region of the media pack; the second end cap having a seal holder projecting axially therefrom and constructed and arranged to hold a seal member to form an inwardly directed radial seal; and a seal member within the seal holder of the second end cap.

In example embodiments, the seal member is one of overmolded with the second end cap, formed with the second end cap, and/or attached to the second end cap.

The media pack preferably comprises a cylinder of pleated media.

Preferably, an inner diameter of the seal member is greater than 80% of an outer diameter of the media pack.

In some embodiments, an inner diameter of the seal member is less than 120% of an outer diameter of the media pack.

Some examples include the first end cap having a seal holder projecting axially therefrom and holding a seal member to form an outwardly directed radial seal.

Some examples include the first end cap having a seal holder projecting axially therefrom and holding a seal member to form an inwardly directed radial seal.

In one or more example embodiment, the cartridge includes an open filter interior and a hydrophobic mesh media member in the open filter interior.

Preferably, the second end cap has an open center.

In another aspect, a method of servicing a filter assembly is provided, the filter assembly having a housing and a removable filter cartridge therein. The method includes removing the filter cartridge from an interior volume of the housing, the housing having an interior surface; providing a new filter cartridge having a seal member; and positioning the new filter cartridge in the interior volume of the housing such that the seal member does not come into contact with the interior surface of the housing before reaching an installed position.

In many examples, the step of positioning the new filter cartridge in the interior volume of the housing includes the seal member not contacting any portion of an inside surface of a surrounding wall of the housing.

In many examples, the step of positioning includes positioning the seal member to form a seal with an upstream surface of an upright section radially spaced from an inside surface of a surrounding wall of the housing.

There is no requirement that all of the techniques described herein be incorporated in a given system, for that system to obtain at least some advantage.

DETAILED DESCRIPTION

Figure 1:
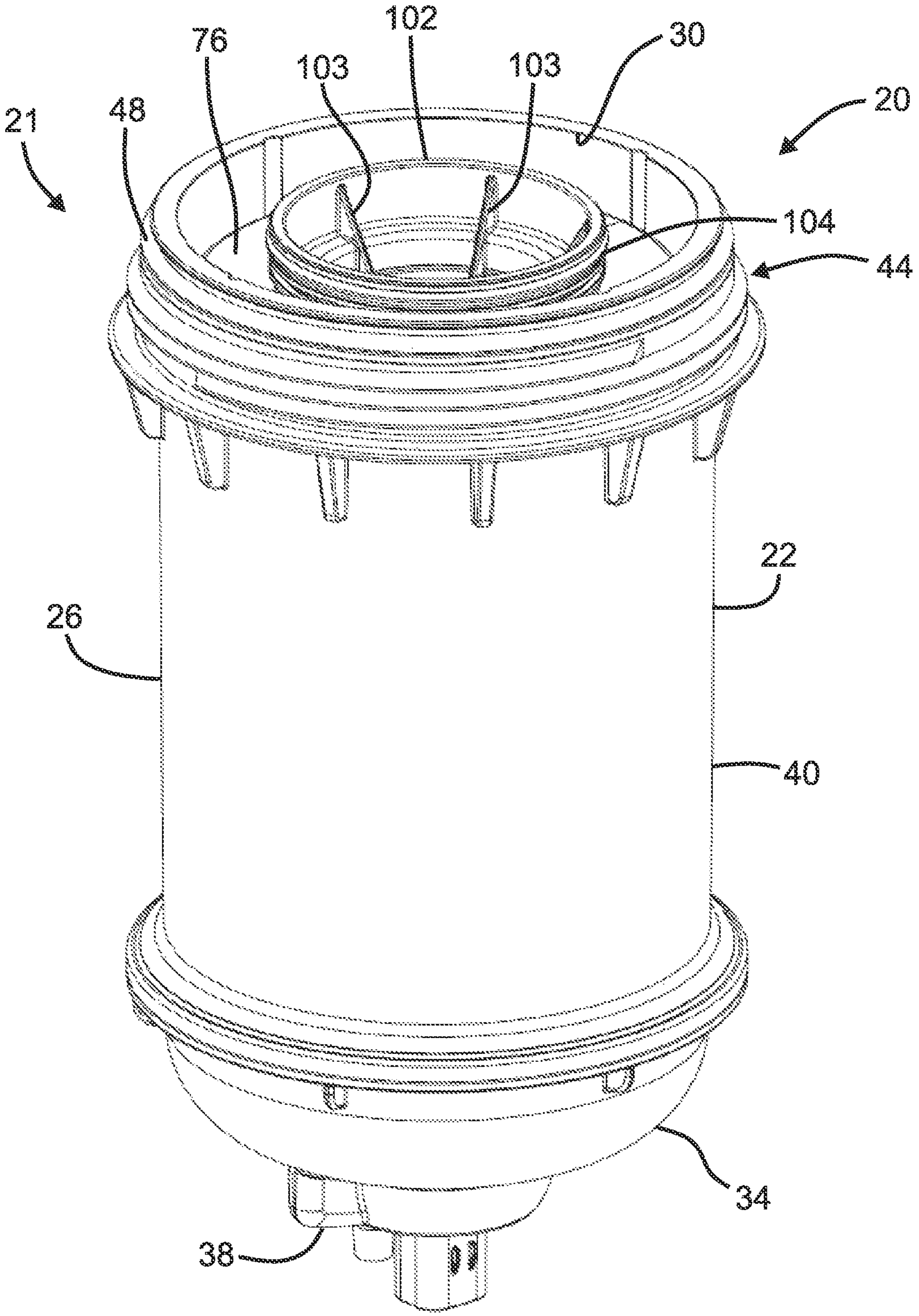
FIG. 1 is a perspective view of one embodiment of a filter assembly including a housing and a filter cartridge, constructed in accordance with principles of this disclosure.

FIGS. 1-10 illustrate an example embodiment of a bowl cartridge filter arrangement or assembly, in which there is an annular trap to catch and collect any contaminant, debris, or unfiltered fuel remaining in the housing during filter service. This prevents material collected in the trap from being transferred to the clean side of a new filter, thereby reducing engine exposure.

In reference now to FIGS. 1-10, a filter assembly is shown generally at 20. The filter assembly 20 is a bowl cartridge filter arrangement 21, in which there is a housing 22 holding a removable and replaceable filter cartridge 24. The housing 22 removably connects to a filter head (not shown). After a period of time, the filter cartridge 24 must be removed and replaced. To do so, the housing 22 is removed from the filter head, the filter cartridge 24 is removed from the housing 22, and a new filter cartridge 24 is inserted into the housing 22. The housing 22 with the new filter cartridge 24 is again reinstalled on the filter head.

The filter housing 22 includes a surrounding wall 26 defining an interior volume 28. The housing 26 has, at one end, an open mouth 30 in communication with the internal volume 28. The filter cartridge 24 can be removed and replaced through the open mouth 30. The housing 22 further includes an end 32 opposite of the open mouth 30.

Figure 2:
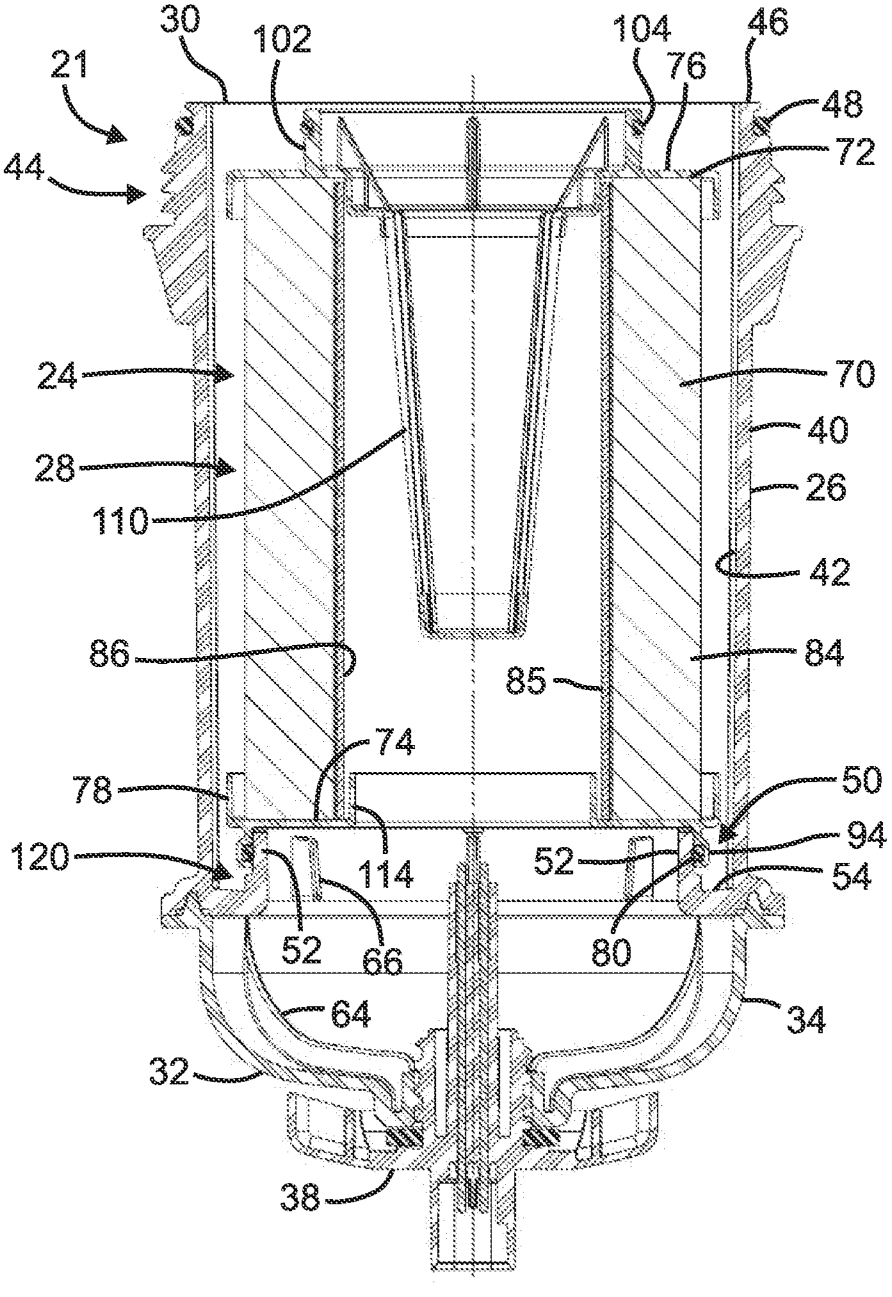
FIG. 2 is a cross-sectional view of the filter assembly of FIG. 1.
Figure 3:
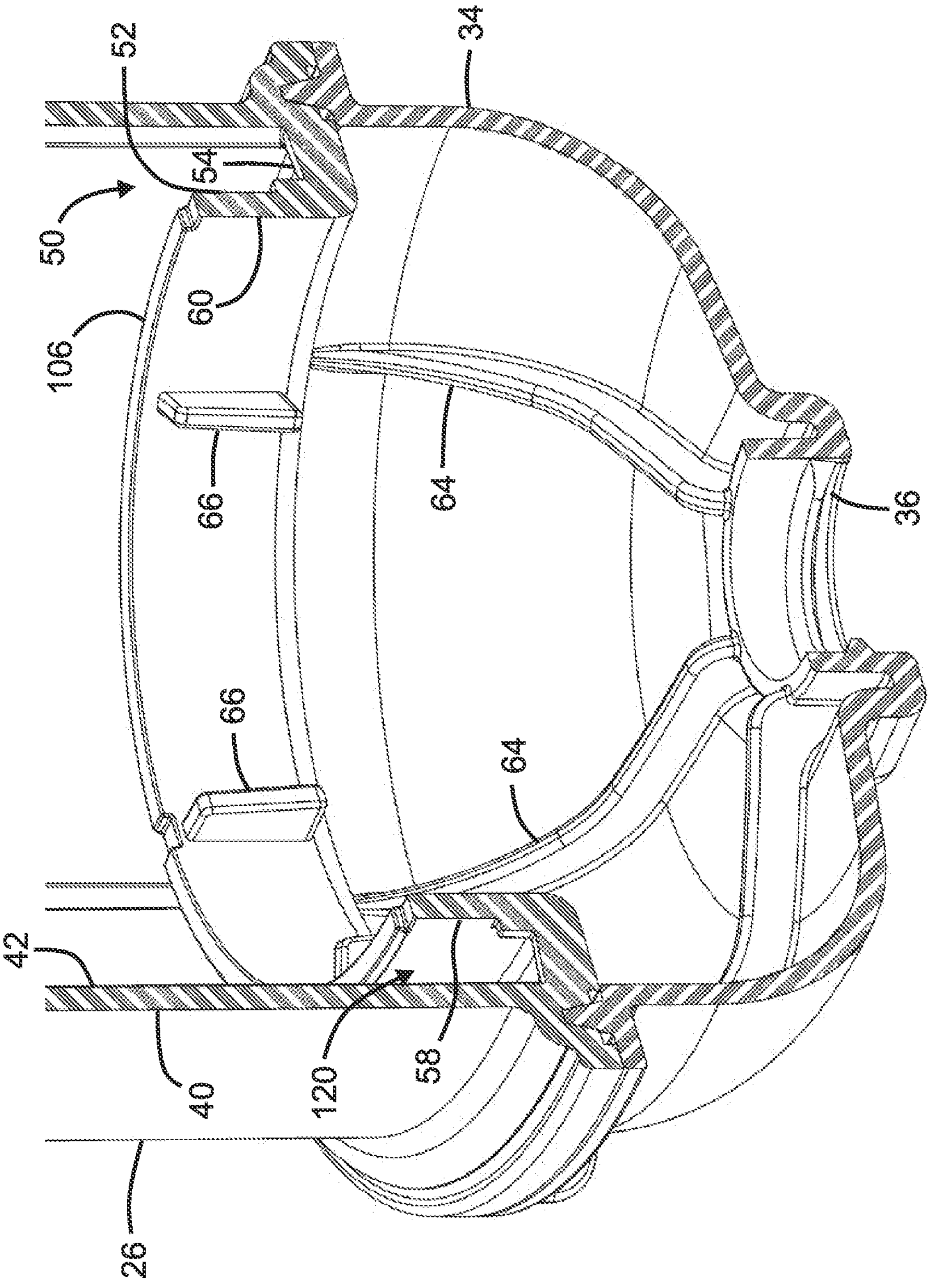
FIG. 3 is a perspective, cross-sectional view of a lower portion of the filter housing of the assembly of FIGS. 1 and 2.

In example embodiments, the housing 22 includes a collection bowl 34 for collecting fluid, such as water, at the end 32 opposite of the open mouth 30. The water collection bowl 34 is generally dish-shaped and includes an open drain 36 which is openable and closable with a valve assembly 38. As can be seen in FIG. 2, the valve assembly 38 is threadably connected to the bowl 34.

The surrounding wall 26 has an exterior surface 40 and an opposite interior surface 42. The interior surface 42 is in communication with the interior volume 28. Along the exterior surface 40 and adjacent to the mouth 30 is a threaded section 44, oriented for connection with a threaded filter head. Between the threaded section 44 and a terminal end 46 at the mouth 30 is a seal member 48, oriented to form a seal with the filter head. As can be seen, the filter seal member 48 is directed radially outwardly from the exterior surface 40 of the surrounding wall 26 of the housing 22. In other embodiments, the seal member 48 can be radially inwardly directed.

The filter housing 22 further includes a surrounding trap 50 in the interior volume 28. The surrounding trap 50 includes a solid, non-porous upright wall or section 52 radially spaced from the interior surface 42 of the surrounding wall 26.

The trap further includes a solid, non-porous connecting section 54 bridging the upright section 52 and the interior surface 42 of the surrounding wall 26. In general, in this embodiment, the upright section 52 is generally parallel to the surrounding wall 26, while the connecting section 54 is perpendicular both the upright section 52 and the wall 26.

The trap 50 is located nearer the end 32 than the mouth 30. The trap 50 is located spaced axially between the bowl 34 and the threaded section 34 of the housing 22.

The upright section 52 has an upstream surface 58, which faces the interior surface 42 of the surrounding wall 26. On an opposite side of the upstream surface 58 is a downstream surface 60. In general, during normal filtration operation, the upstream surface 58 is on the “dirty” or unfiltered side of the cartridge 24, while the downstream surface 60 is on the “clean” or filtered side of the cartridge 24.

In preferred embodiments, the housing 22 further includes an optional plurality of ribs along the interior surface 42 of the surrounding wall 26. Furthermore, there is an optional plurality of ribs 66 along the downstream surface 60 of the upright section 52. In addition, there are optional spaced ribs 67 (FIG. 3) on the connecting section 54. Each of these ribs at the various locations can prevent these surfaces from being used as unintended sealing surfaces. Unintended sealing surfaces could reduce effectiveness of the trap 50.

The filter cartridge 24 is removably positioned in the interior volume 28 of the housing 22. The filter cartridge includes a media pack 70 having a first end region 72 and an opposite end region 74.

A first end cap 76 is secured to the first end region 72. A second end cap 78 is secured to the second end region 74.

A seal member 80 is attached to the second end cap 78 and is positioned to form a seal with the upstream surface 58 of the upright section 52.

Figure 5:
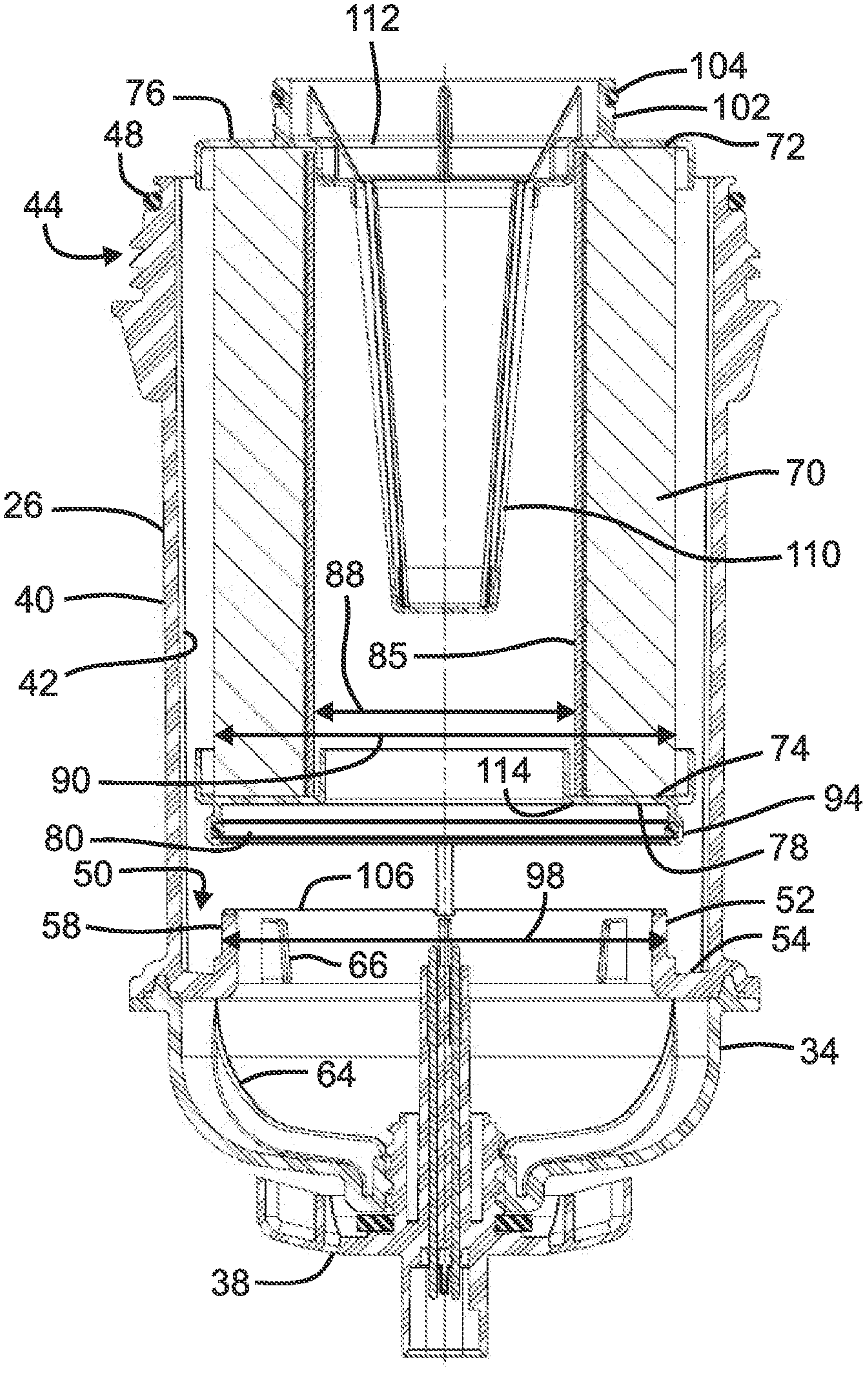
FIG. 5 is a cross-sectional view of the assembly of FIG. 4.
Figure 6:
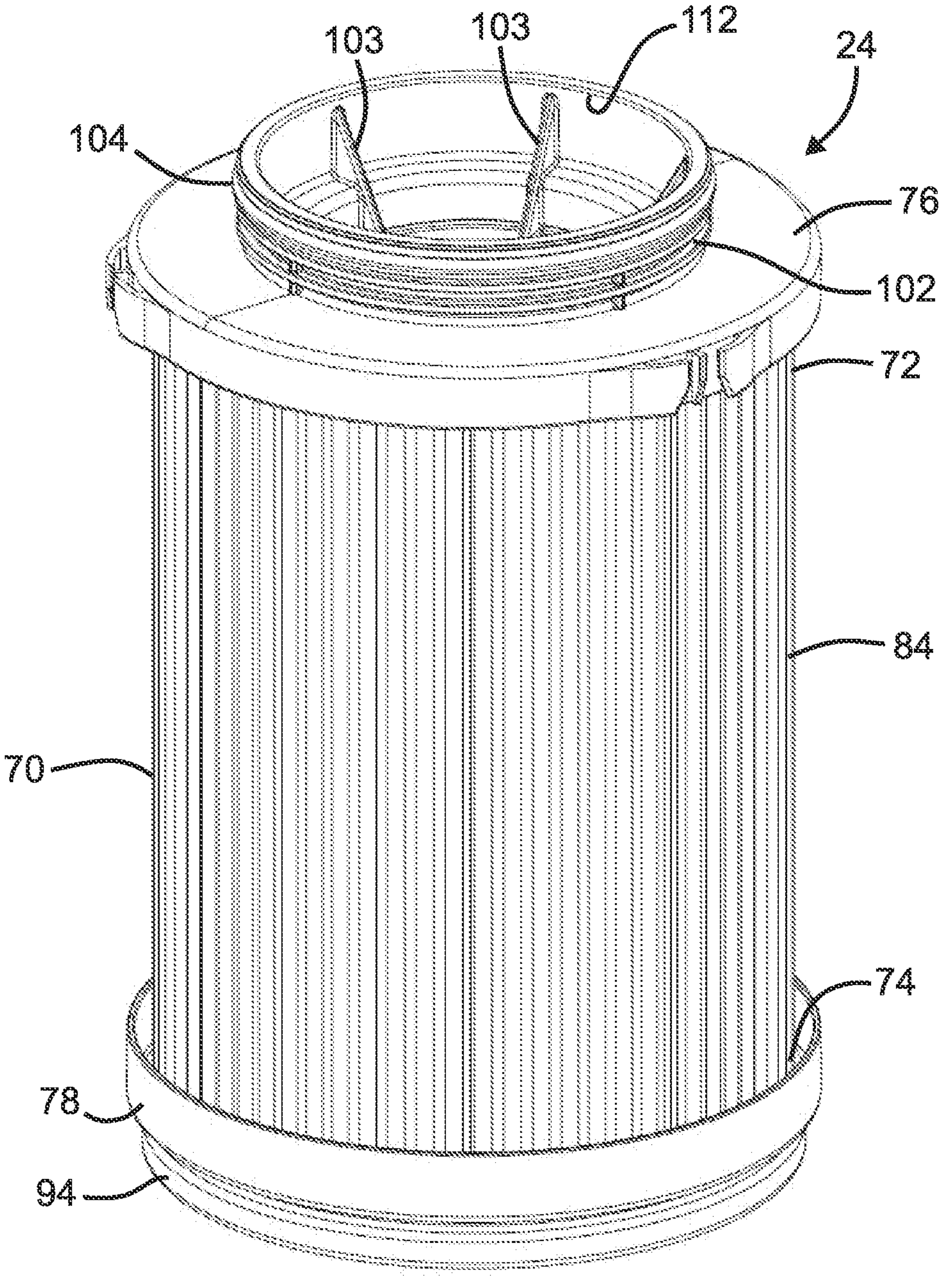
FIG. 6 is a perspective view of the filter cartridge used in the assembly of FIG. 1.
Figure 7:
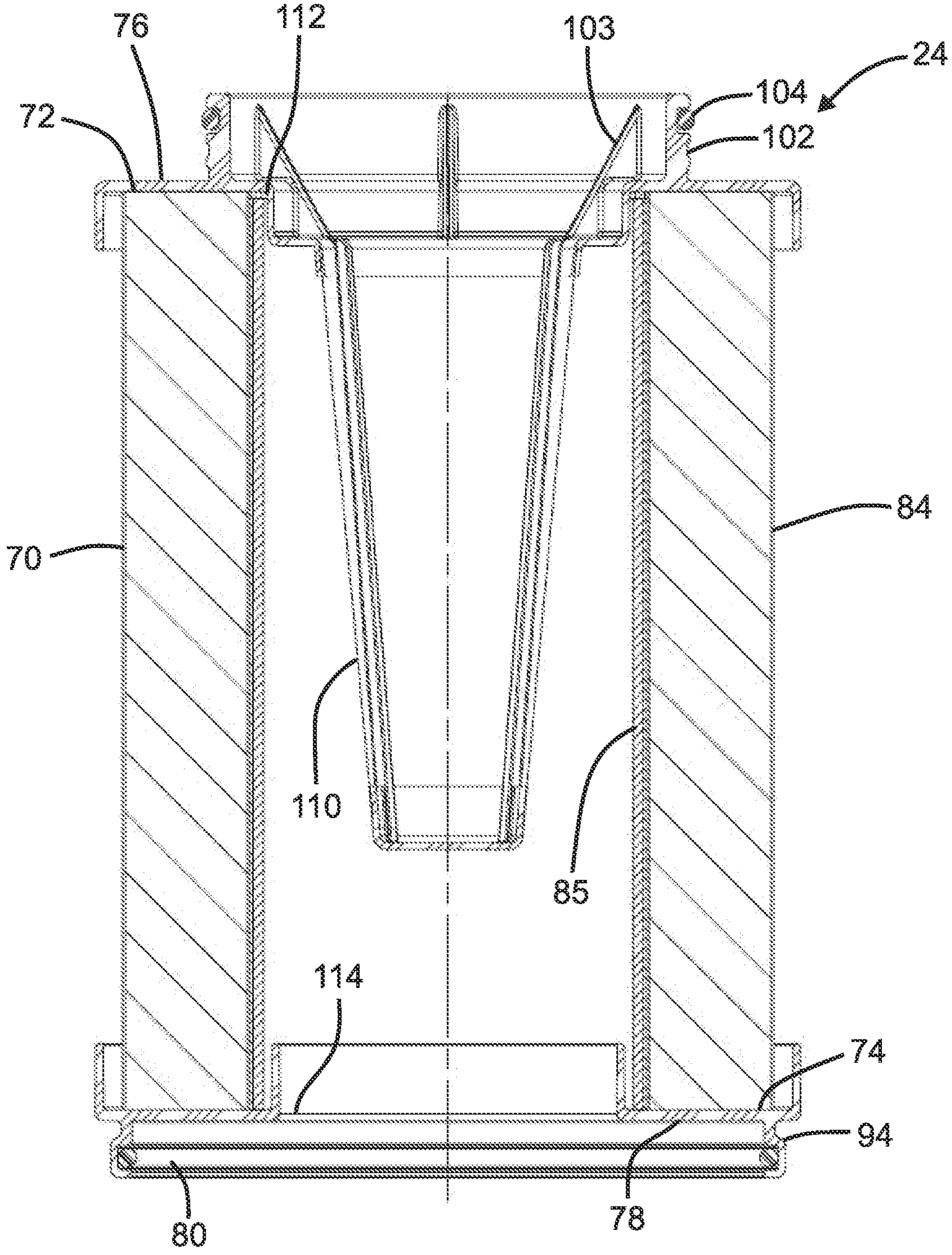
FIG. 7 is a cross-sectional view of the filter cartridge of FIG. 6.
Figure 8:
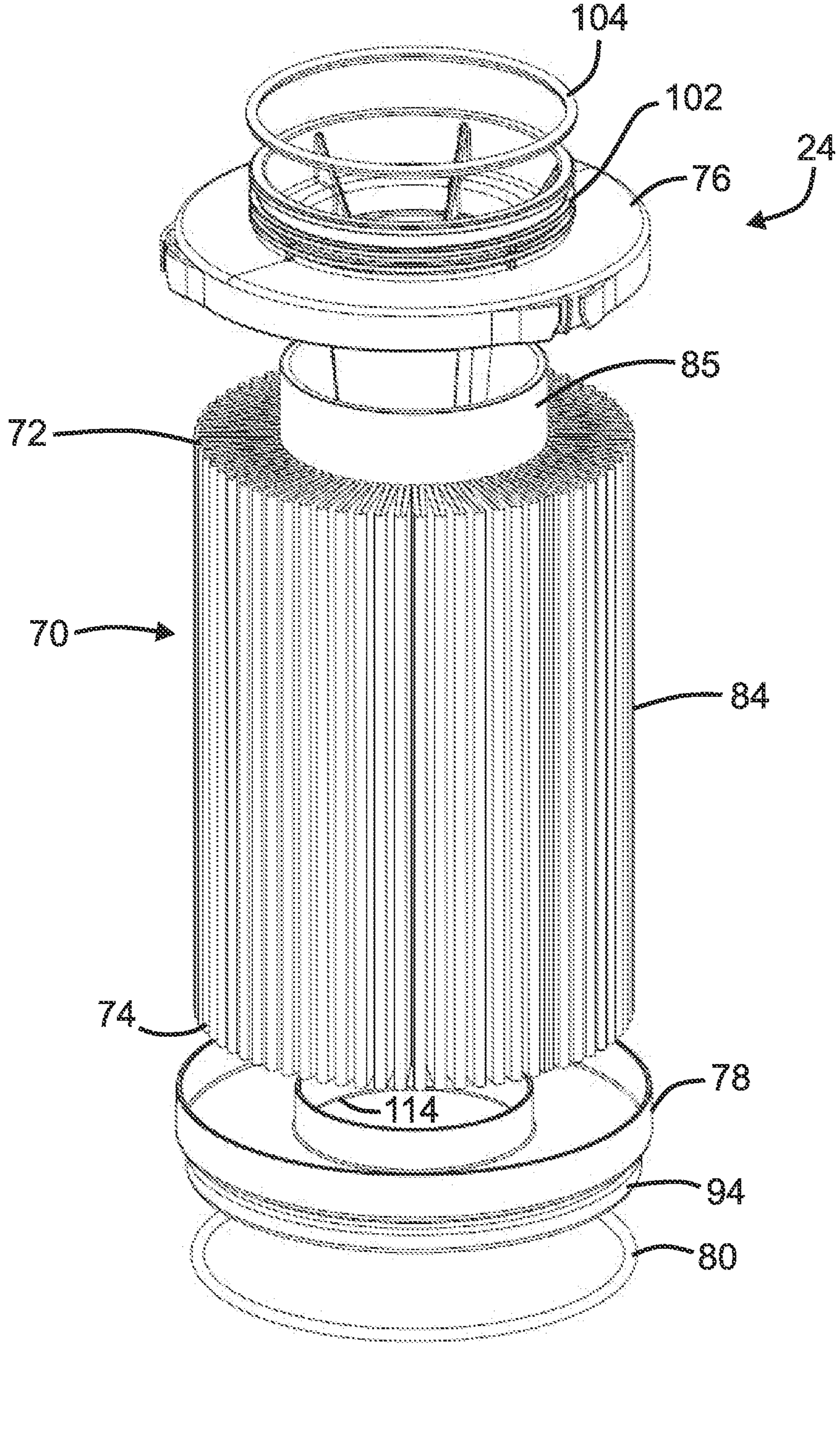
FIG. 8 is an exploded, perspective view of the filter cartridge of FIG. 7.
Figure 9:
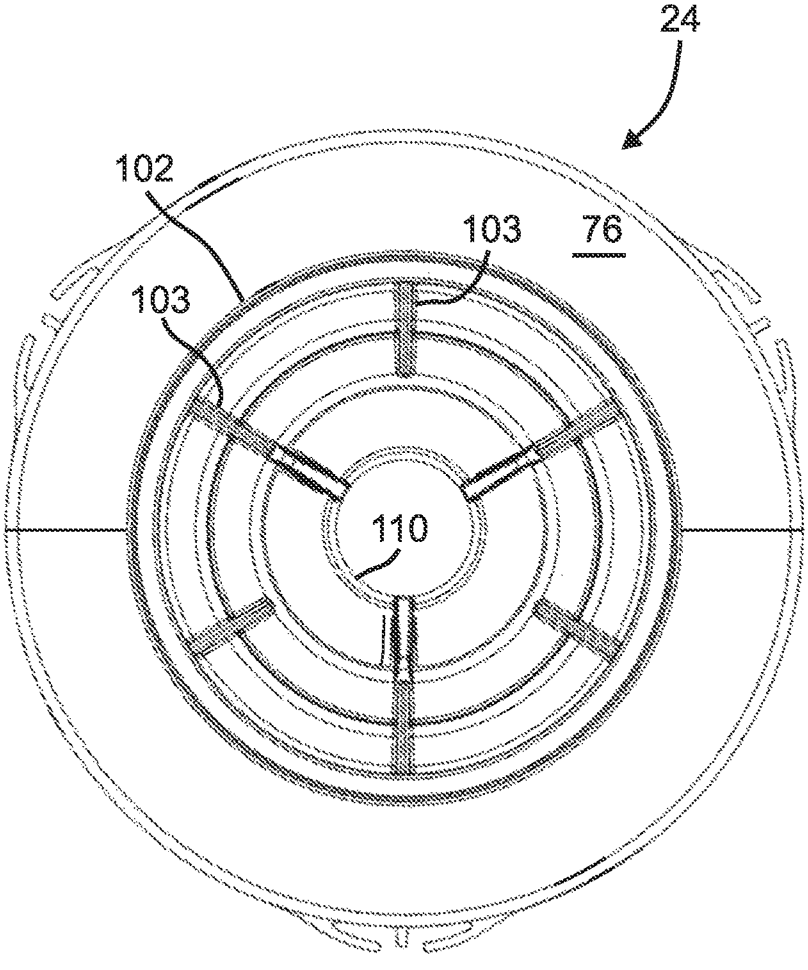
FIG. 9 is a top plan view of the filter cartridge of FIG. 6.
Figure 10:
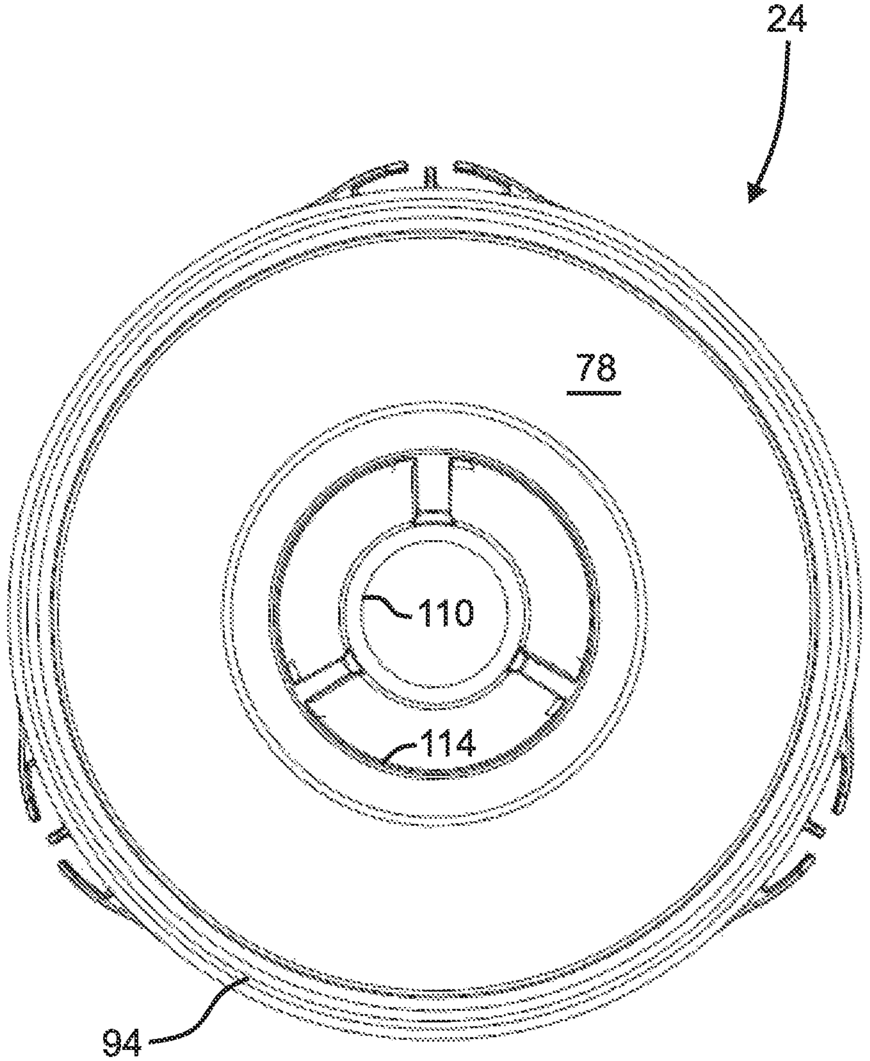
FIG. 10 is a bottom plan view of the filter cartridge of FIG. 6.

While many embodiments are possible, in the example shown, the media pack 70 comprises a cylinder of pleated media 84 having an open filter interior 86. The pleated media 84 has an inner diameter 88 and an outer diameter 90 (FIG. 5). The pleated media 84 is supported along the filter interior 86 with an inner liner 85.

The second end cap 78 includes a seal holder 94. The seal holder 94 projects axially from the second end cap 78 and away from the media 70. The seal holder 94 holds the seal member 80 to form an inwardly directed radial seal with the upstream surface 58 of the upright section 52.

In reference to FIG. 5, the upstream surface 58 of the upright section 52 has a diameter at 98. The diameter 98 is approximately equal to an inner diameter of the seal member 80. This diameter 98 is preferably greater than 80% of the outer diameter 90 of the media pack 70. In preferred embodiments, the diameter 98 is less than 120% of the outer diameter 90 of the media pack 70. For example, in many preferred arrangements, the diameter 98 is 85-115% of the outer diameter 90 of the media pack 70. This arrangement results in advantages.

The first end cap 76 includes a seal holder 102 projecting axially from the first end cap 76 and holding a seal member 104 to form an outwardly directed radial seal. The outwardly directed radial seal is formed with a properly placed filter head. Many embodiments are possible. The seal holder 102 is supported by gussets 103 along an inner radial portion of the seal holder 102.

As can be seen from reviewing FIG. 2, the trap 50 is located between the second end cap 78 and the water collection bowl 34. Also from reviewing FIG. 2, a terminal end 106 of the upright section 52 is axially between the second end region 74 of the media pack 70 and the connecting section 54 of the trap 50. In addition, there may be optional spaced ribs or recessed notches on the terminal end 106. The ribs or recessed notches can prevent unintended axial seal on the terminal end 106.

While many embodiments are possible in the example shown, the filter cartridge 24 further includes a hydrophobic final stage media member 110. The coalescing of water is done in the pleated media 70, and in an optional second stage coalescing wrap media which would be located between the pleated media 70 and the cylindrical inner liner 85. Hydrophobic media 110 is supported by a frame member 111 that supports overmolded hydrophobic mesh media 110, which is the final stage of media, in this example embodiment. The hydrophobic media mesh 110 is used to separate the coalesced water droplets (formed in the previous media stage(s) 70) from the primary fuel flow which is exiting the filter 24 through the first end cap 76 towards the filter head and on to the engine. When the coalesced water droplets are blocked by the hydrophobic media mesh 110 they are forced to fall down towards the water bowl 34. While the hydrophobic media mesh 110 is shown in the example embodiment as an integral structure to the first end cap 76, it could also be made as a separate component and assembled to the first end cap 76.

As can be seen in FIG. 2, hydrophobic mesh member 110 is generally conically shaped and extends from the first end region 72 only a partial extension toward the second end region 74 within the interior 86. Alternatives are possible, but the one shown, is advantageous.

In this embodiment, the second end cap 78 has an open center 114. The first end cap 76 is open to fluid flow, but contains the hydrophobic mesh member 110.

Figure 4:
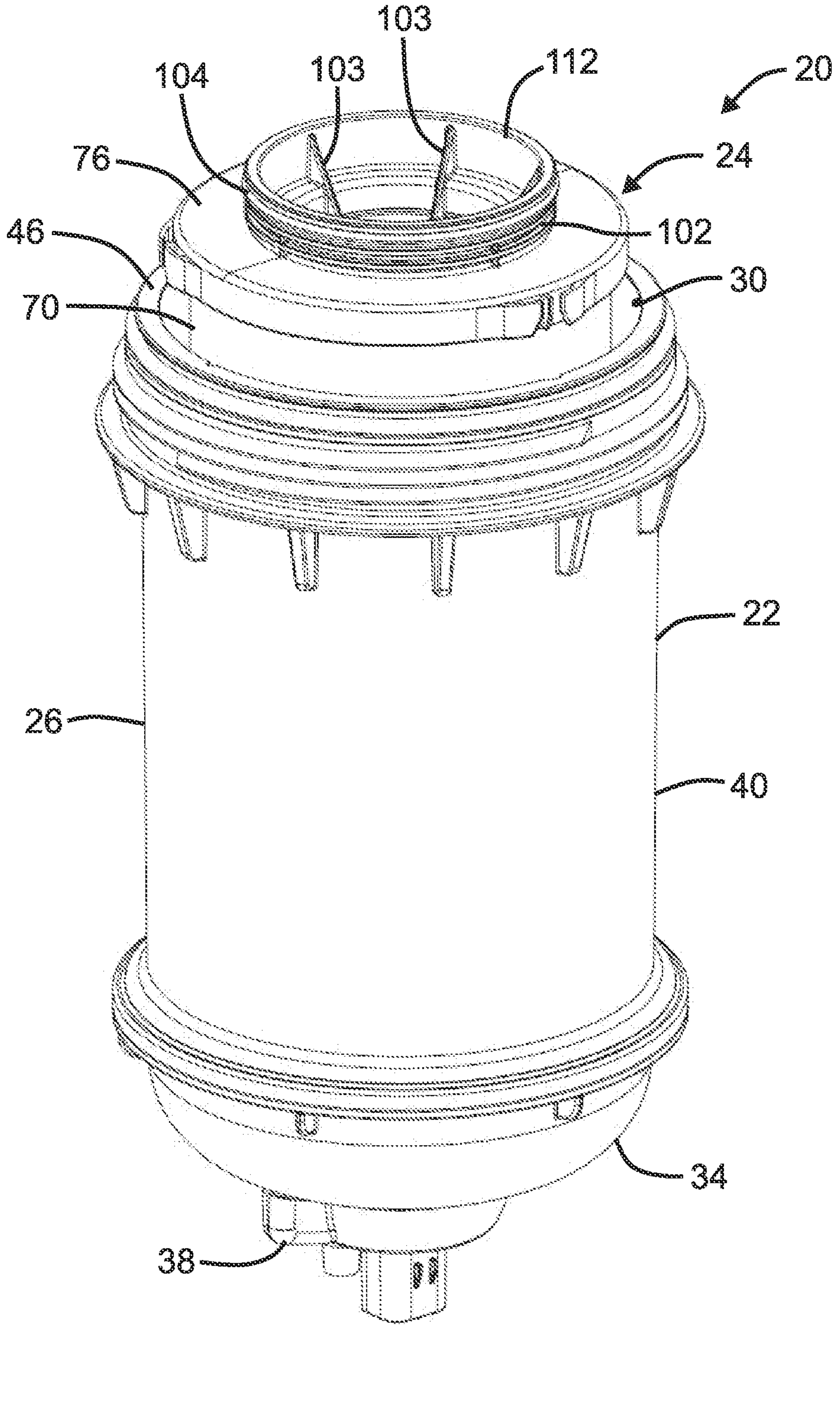
FIG. 4 is a perspective view of the assembly of FIG. 1 and showing the filter cartridge being removed from the filter housing.

The filter assembly 20 may be serviced by removing the housing 22 from the filter head. After the filter assembly 20 is removed from the head, but before the filter cartridge 24 can be accessed through the mouth 30, the filter assembly 20 should be drained of fuel and water. The water and fuel on the downstream side of the filter can be drained through the water drain valve 38. The fuel on the upstream side can be drained from the open mouth 30. Once drained, the cartridge 24 can be pulled through the mouth 30. The filter cartridge 24 is pulled through the mouth 30 of the housing 22, such as shown in FIGS. 4 and 5. When this is done, any unfiltered, residual fluid, such as fuel, is trapped an contained in the trap volume 120, located between the upstream surface 58 of the upright section 52, the connecting section 54, and the interior surface 42 of the wall 26.

A new, replacement filter cartridge 24 is then provided. The new cartridge 24 is inserted through the mouth 30 and lowered into the housing 22 such that the seal member 48 is pressed against the upstream surface 58 of the upright section 52 of the trap 50. The cartridge 24 is continued to be lowered, until in the position of FIG. 2, with the seal member 48 forming a seal with the upright section 52. The process of installing the filter cartridge 24 also results in the seal member 48 wiping the upstream surface 58 of the upright section 52. This action will push any contaminant, debris, or unfiltered fuel clinging to the upstream surface 58 of the upright section 52 back onto the dirty side of the pleated media 84. This has advantages over traditional designs, in which the seal member pushes contaminant, debris, or unfiltered fuel down into the water bowl 34 on the clean side of the media 84, which potentially exposes the engine.

Once the new filter cartridge 24 has been operably positioned within the housing 22, the assembly 20 can again be reconnected to the filter head.

The above represents example principles. Many embodiments can be made using these principles.

What is claimed is:

1. A filter assembly comprising:

(a) a housing having a surrounding wall defining an interior volume; an open mouth in communication with the interior volume; an end opposite of the open mouth; and a surrounding trap in the interior volume;

(i) the surrounding trap including a nonporous upright section radially spaced from the surrounding wall, and a nonporous connecting section bridging the upright section and an interior surface of the surrounding wall;

(A) the upright section having an upstream surface facing the interior surface of the surrounding wall; and (b) a filter cartridge removably positioned in the interior volume of the housing; the filter cartridge having:

(i) a media pack having first and second opposite end regions, the media pack being positioned in the interior volume of the housing;

(ii) a first end cap secured to the first end region of the media pack;

(iii) a second end cap secured to the second end region of the media pack; and (iv) a seal member on the second end cap and positioned to form a seal with the upstream surface of the upright section.

2. The filter assembly of claim 1 wherein the seal member is one of overmolded with the second end cap, formed with the second end cap, and/or attached to the second end cap.

3. The filter assembly of claim 1 wherein:

the media pack comprises a cylinder of pleated media;

the second end cap includes a seal holder projecting axially from the second end cap and holding the seal member to form an inwardly directed radial seal with the upstream surface of the upright section;

a diameter of the upstream surface of the upright section is greater than 80% of an outer diameter of the media pack; and a diameter of the upstream surface of the upright section is less than 120% of an outer diameter of the media pack.

4. The filter assembly of claim 1 wherein the first end cap includes a seal holder projecting axially from the first end cap and holding a seal member to form an outwardly directed radial seal.

5. The filter assembly of claim 1 wherein the housing includes a water collection bowl with a valve opening at the end opposite of the open mouth.

6. The filter assembly of claim 5 wherein the trap is located between the second end cap and the water collection bowl.

7. The filter assembly of claim 1 further including a plurality of ribs along the interior surface of the surrounding wall.

8. The filter assembly of claim 1 wherein the upright section has a downstream surface on an opposite side from the upstream surface, and further including a plurality of ribs along the downstream surface of the upright section.

9. The filter assembly of claim 1 wherein a terminal end of the upright section is axially between the second end region of the media pack and the connecting section of the trap.

10. The filter assembly of claim 1 wherein an exterior of the surrounding wall includes a threaded section adjacent to the mouth and a seal member.

11. The filter assembly of claim 1 further including an open filter interior and a hydrophobic mesh media member in the open filter interior.

12. The filter assembly of claim 1 wherein the second end cap has an open center.

13. The filter assembly of claim 11 wherein the first end cap has a fluid opening containing the hydrophobic mesh media member.

14. A method of servicing a bowl cartridge filter assembly; the filter assembly having a housing and a removable filter cartridge therein; the method comprising:

(a) removing the filter cartridge from an interior volume of the housing;

(b) providing a new filter cartridge having a media pack; and (c) positioning the new filter cartridge so that the media pack is in the interior volume of the housing to orient a seal member secured to the filter cartridge against an upstream surface of an upright section of a trap radially spaced from, and facing, an interior surface of the housing.

15. A filter cartridge for removable positioning in a bowl-cartridge filter assembly; the filter cartridge comprising:

(a) a media pack having first and second opposite end regions;

(b) a first end cap secured to the first end region of the media pack;

(c) a second end cap secured to the second end region of the media pack; the second end cap having a seal holder projecting axially therefrom and constructed and arranged for a seal member to form an inwardly directed radial seal; and (d) a seal member within the seal holder of the second end cap.

16. The filter cartridge of claim 15 wherein the seal member is one of overmolded with the second end cap, formed with the second end cap, and/or attached to the second end cap.

17. The filter cartridge of claim 15 wherein:

the media pack comprises a cylinder of pleated media;

an inner diameter of the seal member is greater than 80% of an outer diameter of the media pack;

an inner diameter of the seal member is less than 120% of an outer diameter of the media pack;

the second end cap has an open center; and the first end cap includes a seal holder projecting axially therefrom and holding a seal member to form an outwardly directed radial seal.

18. The filter cartridge according to claim 15 further including an open filter interior and a hydrophobic mesh media member in the open filter interior.

19. The filter cartridge of claim 18 wherein the first end cap has a fluid opening containing the hydrophobic mesh media member.

20. A method of servicing a filter assembly; the filter assembly having a housing and a removable filter cartridge therein; the method comprising:

(a) removing the filter cartridge from an interior volume of the housing, the housing having an interior surface;

(b) providing a new filter cartridge having a seal member and a media pack; and (c) positioning the new filter cartridge so that the media pack is in the interior volume of the housing, and such that the seal member does not come into contact with the interior surface of the housing before reaching an installed position.

* * * * *